Feb. 18, 1936.  H. C. DRAKE  2,031,469

METHOD AND MEANS FOR DETECTING FLAWS

Original Filed Feb. 17, 1933

Inventor
Harcourt C. Drake
By Joseph H. Lipschutz
Attorney

Patented Feb. 18, 1936

2,031,469

UNITED STATES PATENT OFFICE 2,031,469

METHOD AND MEANS FOR DETECTING FLAWS

Harcourt C. Drake, Hempstead, N. Y., assignor to Sperry Products, Inc., Brooklyn, N. Y., a corporation of New York Application February 17, 1933, Serial No. 657,229
Renewed June 18, 1935

8 Claims. (Cl. 175—183)

This invention relates to a method of and means for detecting flaws within magnetizable materials such as steel rails and the like. Magnetic methods for the testing of magnetizable materials have heretofore been proposed and even experimented with. The great defect of all these systems resides in the fact that while the magnetic flux is interrupted or distorted by the presence of internal flaws which are transverse to the direction of flux, and may therefore be detected, such interruption or distortion is also effected by many other factors such as, for example, hard spots within the material under test, stresses, portions of different chemical composition, etc., and they do not detect internal fissures which are not transverse to the direction of flux.

It is the principal object of my invention, therefore, to provide a magnetic method of testing which will differentiate between actual defects such as fissures and cracks within the material and mere points of abnormal stress or defects in chemical composition such as high sulphur content.

In the accompanying drawing.

Figure 1:
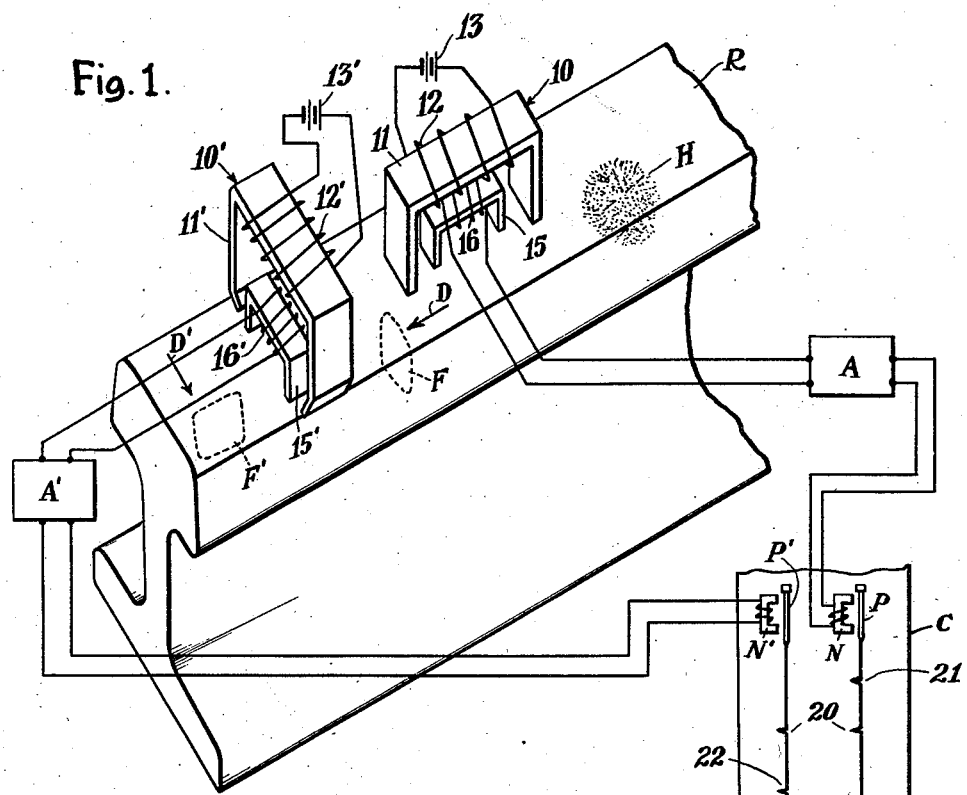
Fig. 1 is a perspective view and assembly showing the principle of my invention as applied to the testing of a conductor, in this case a rail.

Referring first to Fig. 1, the principle of the invention is therein disclosed. The form of magnetic testing heretofore employed may be described as follows: An energizing electromagnet 10 having a core 11 and an energizing coil 12 which receives current from any suitable source such as a battery or generator 13, is positioned with the ends of the core close to the magnetic material under test, in this case the rail R. The member under test thus forms the closure of a magnetic circuit through the core and the said member under test. The lines of flux, therefore, extend in a direction to join the arms of the core 11. As long as the material is free of defect the flux therethrough is uniform, but as soon as a defect is encountered the flux is distorted and such distortion causes certain of the lines of flux to take a different path so that they are picked up by a shunt circuit comprising a core 15 in the form of an inverted U similar to the core 11 and having a coil 16 wound thereon. When a defective portion of member R is encountered, magnetic flux passes into the shunt circuit 15 and induces a voltage in the coil 16 which may be caused to actuate an indicator either directly or through an amplifier A which may amplify the impulse sufficiently to operate a recording pen P on a chart C, the said pen being carried by an armature designed to be attracted by the relay N energized from the amplifier.

As suggested in the introduction, the defect inherent in such a system was that no differentiation could be made between actual defects such as fissures or cracks and portions of stress or strain or of different chemical composition which also caused distortion of magnetic flux but which did not constitute a defect in the material; nor could such system detect fissures that were not transverse to the direction of flux. Thus, for instance, it is apparent from Fig. 1 that the lines of flux set up by magnet 10 extend through member R in the direction D and these lines of flux would be intercepted by a transverse fissure such as F; but lines of flux in a direction D would not be interrupted or distorted by the presence of a longitudinal fissure such as F'. Also, a region of a hard spot as indicated at H would distort the lines of flux in a direction D. By my invention I provide in addition to the magnet 10 a similar magnet 10' positioned at right angles to the magnet 10 and having a core 11' in the form of an inverted U similar to core 11. A detector magnet 15' similar to magnet 15 cooperates with the magnet 10' in the same manner that magnet 15 cooperates with magnet 10. The magnet 10' may be energized by a coil 12' from any suitable source 13'. The core 15' may be provided with a detecting coil 16' and the induced voltages in said core may be caused to actuate an indicator or a recorder such as a pen P' similar to pen P after being amplified by amplifier A'.

By the above construction I simultaneously accomplish two results. In the first place, I am enabled to detect longitudinal fissures as well as transverse fissures and in the second place I am enabled to distinguish between fissures and hard spots, etc. The reason for the first of these is that the flux between the arms of core 11' is in the direction of arrow D' so that longitudinal fissures F' will interrupt and distort this flow. Transverse fissures, however, such as F will not interrupt or distort the flow in the direction D' but will disturb the flow of flux in the direction D. So that the pen P will indicate the presence of transverse fissures while the pen P' will indicate the presence of longitudinal fissures.

With respect to the second advantage obtained by my invention, that is, the differentiation between fissures and hard spots, etc., the reason for this is as follows: It will be apparent that a hard spot such as H will interrupt flux in the direction D as well as in a direction D'. In other words, when a hard spot is encountered it will be picked up by both pens P and P'. Thus there will be obtained an indication as indicated at 20 on the chart where both pens have indicated the presence of a defect. Such a defect is therefore due to a hard spot. But an indication such as 21 made by pen P alone indicates the presence of a transverse fissure, while an indication such as 22 made by pen P' alone indicated the presence of a longitudinal fissure. While I have disclosed means for sending flux through an object under test longitudinally and transversely this angular relation may be varied where it is desired to detect flaws at some other angular relationship with respect to the axis of the object.

Figure 2:
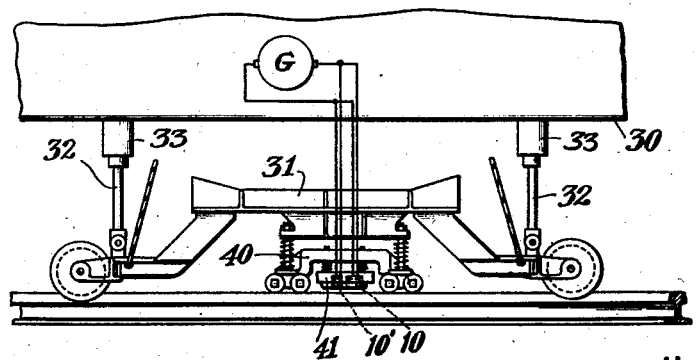
Fig. 2 is a side elevation of a portion of a car having my invention applied thereto and adapted to run on tracks for testing the same.

For testing of rails in track or for other elongated magnetic members I may mount the device on a car, a portion of whose body 30 is illustrated in Fig. 2, which is designed to carry the detector means by a carriage 31 which may be raised and lowered from the car body by means of pistons 32 attached to the carriage 31, said pistons operating in cylinders 33 which may be supplied with fluid pressure. The carriage may be raised by means of springs and cables when the fluid pressure is cut off. The detector means may be supported on the carriage 31 for movement independent thereof by means of a carriage 40, the said carriage supporting the search unit 41 within which are mounted the magnetic systems 10, 10'. Current may be supplied to the energizing coils 12, 12' from a suitable source within a car body such as batteries 13 and 13' or a generator such as G.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting fissures within magnetizable objects consisting in setting up flux in a plurality of directions through the object under test and simultaneously indicating variations in flux in each of said directions.

2. The method of detecting fissures within magnetizable objects consisting in setting up flux in two directions, substantially at right angles to each other, through an object under test, and indicating variations in flux in each of said directions.

3. The method of detecting fissures within magnetizable objects and differentiating fissures from other defects consisting in setting up flux in a plurality of directions through the object under test, simultaneously indicating variations in flux in each of said directions and comparing said indications.

4. The method of detecting fissures within magnetizable objects and differentiating fissures from other defects consisting in setting up flux in two directions, substantially at right angles to each other, through an object under test, indicating variations in flux in each of said directions and comparing said indications.

5. In a device for testing magnetizable objects, means for continuously setting up flux through said object in a given direction, means responsive to variations in said flux, an indicating means actuated by said responsive means, a second means for setting up flux through said object in a direction at an angle to said first direction, means responsive to variations in said last-named flux, and a second indicating means actuated by said last-named responsive means.

6. In a device for testing magnetizable objects, means for continuously setting up flux through said object in a given direction, means responsive to variations in said flux, an indicating means actuated by said responsive means, a second means for setting up flux through said object in a direction at an angle to said first direction, means responsive to variations in said last-named flux, and a second indicating means actuated by said last-named responsive means and in comparative relation to said first indicating means.

7. In a device for testing magnetizable objects for transverse and longitudinal fissures and for differentiating said fissures from other defects, means for continuously setting up flux through said object longitudinally, means responsive to variations in said longitudinal flux, an indicating means actuated by said responsive means, a second means for continuously setting up flux through said object transversely, means responsive to variations in said transverse flux and a second indicating means actuated by said last-named responsive means.

8. In a device for testing magnetizable objects for transverse and longitudinal fissures and for differentiating said fissures from other defects, means for continuously setting up flux through said object longitudinally, means responsive to variations in said longitudinal flux, an indicating means actuated by said responsive means, a second means for continuously setting up flux through said object transversely, means responsive to variations in said transverse flux and a second indicating means actuated by said last-named responsive means and in comparative relation thereto.

HARCOURT C. DRAKE.